United States Patent [19]

Mizuhara

[11] Patent Number: 4,711,386

[45] Date of Patent: Dec. 8, 1987

[54] METHOD OF JOINING PYROLYTIC BORON NITRIDE

[75] Inventor: Howard Mizuhara, Hillsborough, Calif.

[73] Assignee: GTE Products Corporation, Stamford, Conn.

[21] Appl. No.: 906,877

[22] Filed: Sep. 15, 1986

[51] Int. Cl.[4] ............................................. B23K 31/02
[52] U.S. Cl. .................................... 228/121; 228/122; 228/263.12; 428/627
[58] Field of Search ...... 228/121, 122, 263.12–263.15, 228/903; 428/627

[56] References Cited

U.S. PATENT DOCUMENTS

| | | | |
|---|---|---|---|
| 4,009,027 | 2/1977 | Naidich et al. | 420/473 |
| 4,391,450 | 7/1983 | Beck | 277/1 |
| 4,535,029 | 8/1985 | Intrater et al. | 427/113 |

*Primary Examiner*—Nicholas P. Godici
*Assistant Examiner*—Samuel M. Heinrich
*Attorney, Agent, or Firm*—James Theodosopoulos

[57] ABSTRACT

A pyrolytic boron nitride article is joined to a metal or ceramic member by use of a brazing alloy containing titanium as an active metal.

13 Claims, No Drawings

METHOD OF JOINING PYROLYTIC BORON NITRIDE

This invention concerns pyrolytic boron nitride. Pyrolytic boron nitride is made by chemical vapor deposition as shown in U.S. Pat. No. 3,152,006. The basic chemistry is shown in U.S. Pat. No. 2,832,672. The product is a hexagonal layer structure material and possesses anisotropic properties. The chemical vapor deposition results in a buildup of layer structure upon layer structure. The weak direction of the material is normal to the layers. Due to its inherent resistance to wetting by most metals and glasses, pyrolytic boron nitride is an excellent material for use as a metal melting crucible, or as a fixture for glassing, etc. However, this nonwetting property also makes the product difficult to join to other materials.

This invention is concerned with a method of joining pyrolytic boron nitride to other materials, for example, metal or ceramic. Pyrolytic boron nitride can be used, for example, in traveling wave tube applications; in such applications, it may be required that the pyrolytic boron nitride be joined to a metal support.

In this invention, pyrolytic boron nitride is joined to a metal or ceramic member by the use of a ductile active brazing filler alloy containing silver, copper and a small amount of titanium. The presence of titanium allows the direct wetting of the pyrolytic boron nitride by the following reaction:

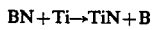

$$BN + Ti \rightarrow TiN + B$$

The reduced metallic boron is wetted by silver-copper alloy.

However, the percentage of titanium should be low enough to allow the silver copper alloy to maintain its inherent ductility in order to provide for thermal expansion misfits between the pyrolytic boron nitride and the material to which it is joined. The amount of titanium in the alloy should be from about 1 to 2 weight percent. The amount of silver and copper necessary to provide a silver copper alloy can be from about 61 to 65 weight percent silver and 37 to 33 weight percent copper. Brazing is done at or above the melting temperature of the alloy.

EXAMPLE 1

A Kovar metal strip 2" long × ¼" wide × 10 mils thick was placed on top of a pyrolytic boron nitride disc and a 2 mil thick foil of Cusil ABA was placed therebetween with a 200 gram load placed on top of the Kovar strip. Kovar is a Westinghouse Co. tradename for an alloy of nickel, iron and cobalt. Cusil ABA is a tradename of GTE Products Corp. for an alloy of 35% copper, 2% titanium, balance silver. The braze was made at 830° C. by a ten minute hold at $10^{-5}$ torr vacuum. On peeling of the metal strip, failure occurred along the weak layer structure of the pyrolytic boron nitride, not at the jointure of the metal to the pyrolytic boron nitride.

EXAMPLE 2

A 125 mil thick pyrolytic boron nitride disc was made by chemical vapor deposition process, and 1" long bars, 125 mils wide × 125 mils thick, were cut from the disc. In joining, an edge of each bar (which provided the stronger surface) was placed toward a 20 mil thick copper sheet and a 2 mil thick foil of Incusil 15 ABA was placed therebetween with pressure provided by a 100 gram load. Incusil 15 ABA is a tradename of GTE Products Corp. for an alloy of 21% copper, 14.5% indium, 1.25% titanium, balance silver. The braze was made in a furnace at 750° C. for a 10 minute soak at $10^{-5}$ torr vacuum. A fillet formed completely around the edge of the bar and the joint was excellent. When the joint was tested, failure occurred through the pyrolytic boron nitride, not at the joint.

EXAMPLE 3

This was the same as Example 2, except that 410 stainless steel was used instead of copper sheet. An excellent joint resulted.

EXAMPLE 4

This was the same as Example 2 except that 1010 steel was used instead of copper sheet. An excellent joint resulted.

EXAMPLE 5

Two pyrolytic boron nitride bars prepared as in Example 2 were bonded by placing a 2 mil thick foil of Cusil ABA between them and brazing under $10^{-5}$ torr vacuum at 840° C. for 10 minutes hold. At rupture, failure occurred across a pyrolytic boron nitride layer, not at the joint.

EXAMPLE 6

A pyrolytic boron nitride bar was joined to AL-995 alumina ceramic using the same procedure as in Example 5. AL-995 is a tradename of GTE Products Corp. for a 99.5% alumina ceramic. An excellent joint resulted.

EXAMPLE 7

This was similar to Example 6 except SNW-1000 ceramic was used instead of AL-995 ceramic. An excellent joint resulted. SNW-1000 is a tradename of GTE Products Corp. for a silicon nitride ceramic.

I claim:

1. The method of joining a pyrolytic boron nitride article to a metal or ceramic member comprising the steps of: forming the pyrolytic boron nitride article by chemical vapor deposition; placing said article and said member in position to be brazed together with a metal alloy foil therebetween, the alloy containing titanium as an active metal in an amount of about 0.5 to 2.5 weight percent; and brazing the article to the member by heating under vacuum at a temperature at which the alloy melts.

2. The method of claim 1 wherein the alloy consists essentially of silver, copper and titanium.

3. The method of claim 2 wherein the alloy consists of 35 wt. % copper wt. 2% titanium, balance silver.

4. The method of claim 1 wherein the alloy consists essentially of silver, copper, indium and titanium.

5. The method of claim 4 wherein the alloy consists of 21.0 wt. % copper, 14.5 wt. % indium, 1.25 wt. % titanium, balance silver.

6. The method of claim 1 wherein said member is made of copper.

7. The method of claim 1 wherein said member is made of steel.

8. The method of claim 1 wherein said member is made of stainless steel.

9. The method of claim 1 wherein said member is made of alumina.

10. The method of claim 1 wherein said member is made of silicon nitride.

11. The method of claim 1 wherein said member is made of pyrolytic boron nitride.

12. The method of claim 1 wherein said member is made of nickel-iron-cobalt alloy.

13. A pyrolytic boron nitride article brazed to a metal or ceramic member and made by the method of claim 1.

* * * * *